Jan. 1, 1946.  D. COLLINS  2,392,230
WINDSHIELD WIPER
Filed July 27, 1942  3 Sheets-Sheet 1
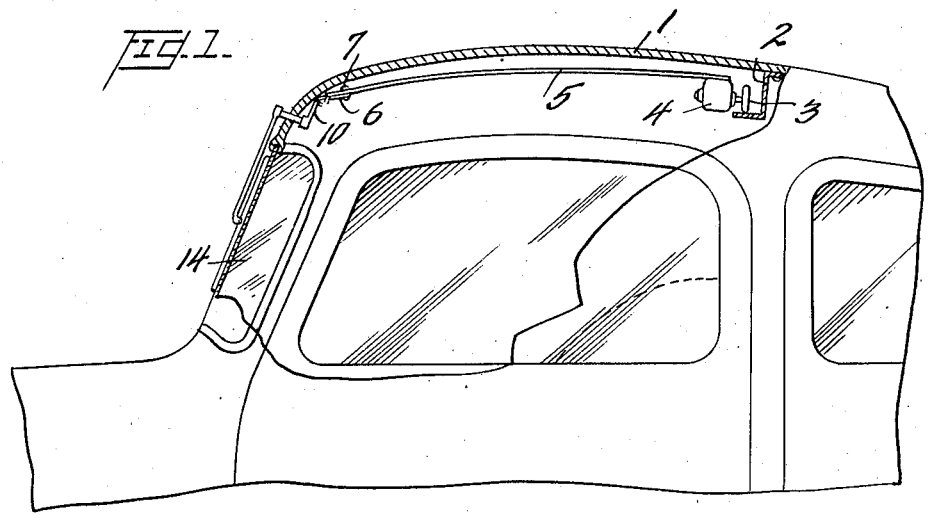
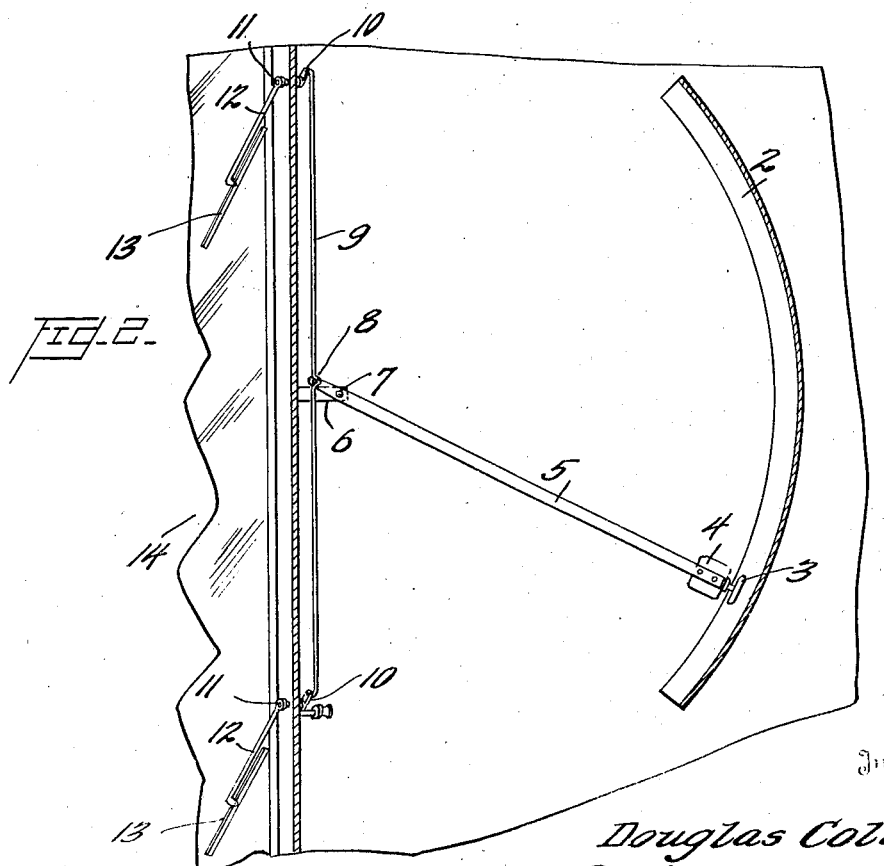
Inventor
Douglas Collins
By John Boyle
Attorney Jan. 1, 1946.  D. COLLINS  2,392,230
WINDSHIELD WIPER
Filed July 27, 1942  3 Sheets-Sheet 2
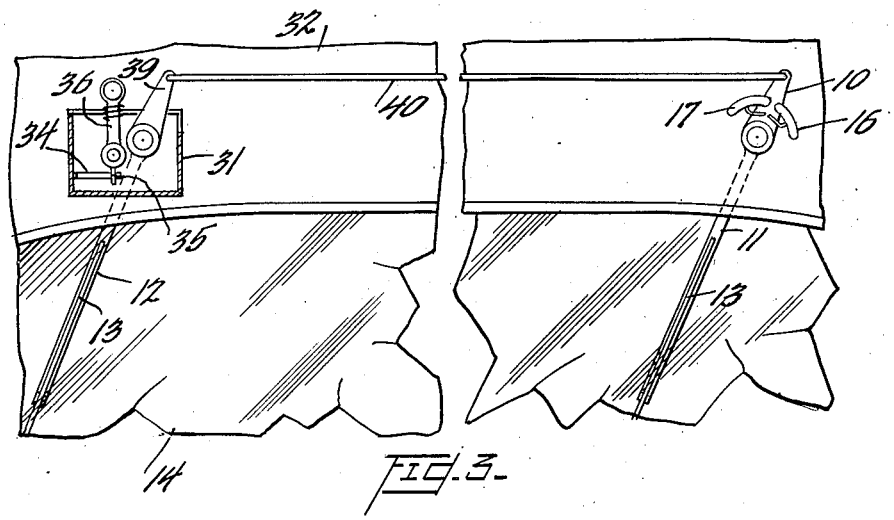
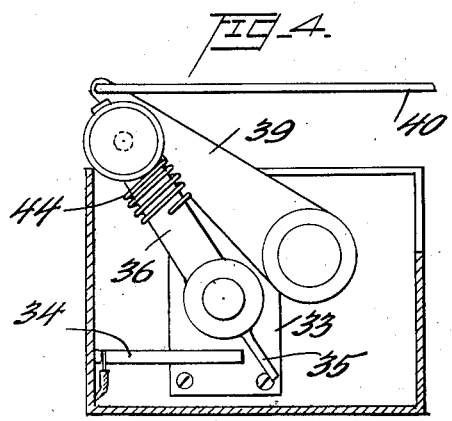
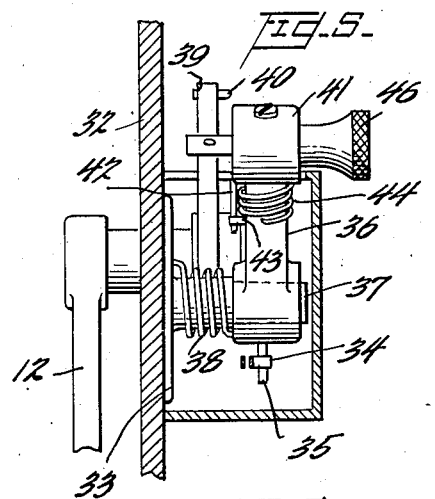
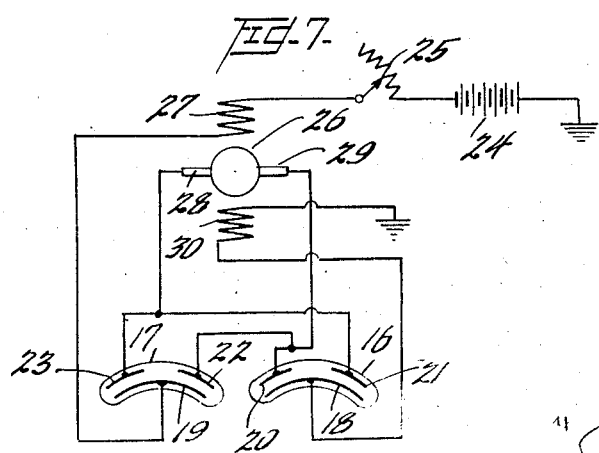
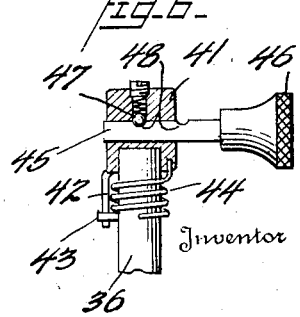
Inventor
Douglas Collins
John Boyle
Attorney Jan. 1, 1946.   D. COLLINS   2,392,230
WINDSHIELD WIPER
Filed July 27, 1942   3 Sheets-Sheet 3
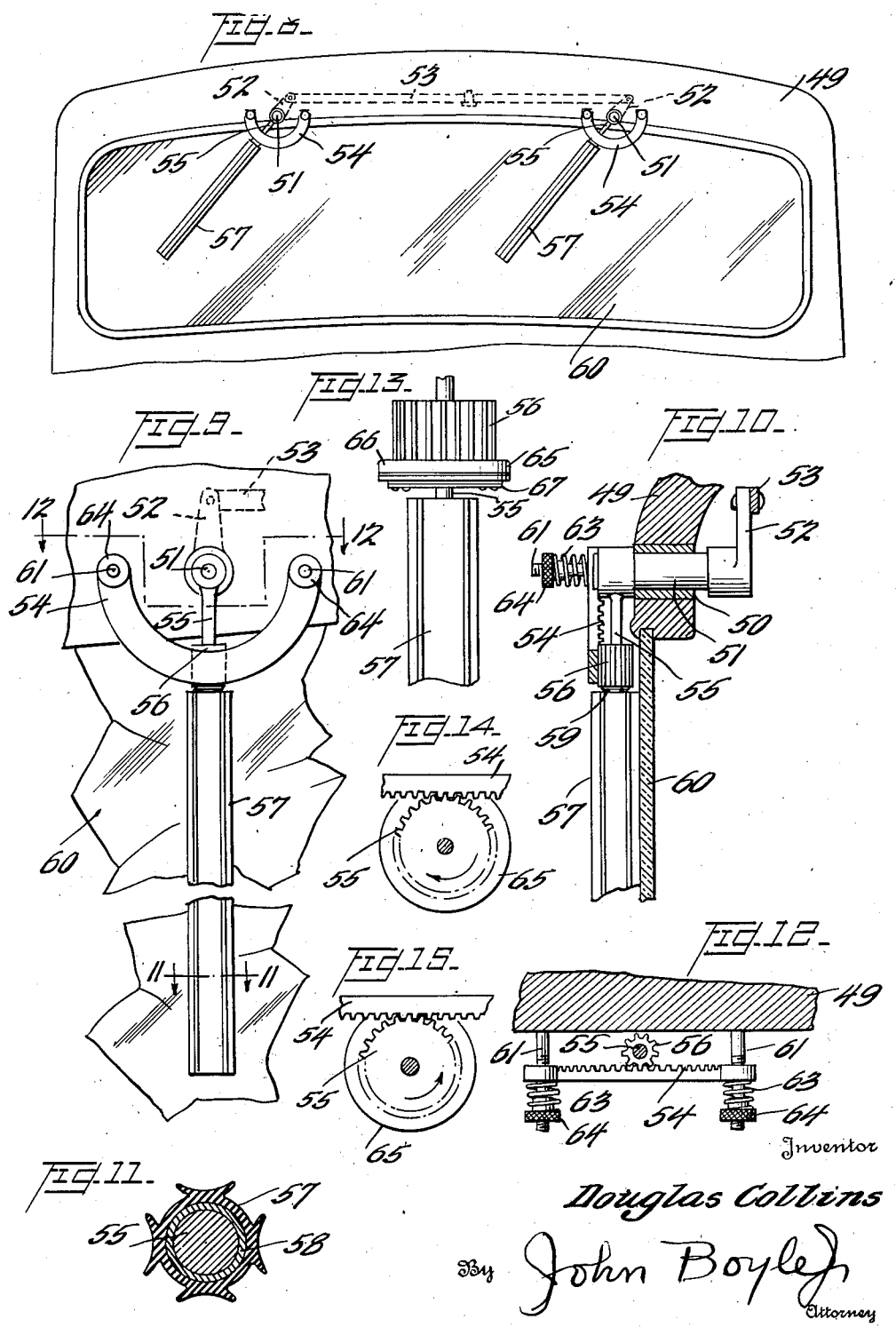

Patented Jan. 1, 1946

2,392,230

UNITED STATES PATENT OFFICE 2,392,230

WINDSHIELD WIPER

Douglas Collins, Salisbury, N. C.

Application July 27, 1942, Serial No. 452,495

14 Claims. (Cl. 15—254)

My invention relates to an electric windshield wiper for automotive vehicles. One of the objects is to provide a wiper in which motion of the wiper blades is transmitted from the motion of an actuating electric motor frame rather than through a direct mechanical connection to the armature by gears and the like.

Another object is to provide an automatic cut off switch for use in connection with electric windshield wipers, so that the wiper blades will be stopped at the ends of the stroke and will be removed from direct line of vision, when at rest.

A further object is to provide a wind shield wiper blade that in operation both reciprocates and rotates.

With these and other objects in view, my invention consists of certain novel and peculiar features of construction and combination of parts as will be more fully hereinafter described and particularly pointed out in the claims.

Referring to the drawings for a more complete disclosure of the invention—

Figure 1 is an elevation, in fragmentary section, showing the wiper motor supported on a traction plate affixed to the car top of an automobile and operating the wiper by an oscillatory lever.

Fig. 2 is a sectional plan view of the operating mechanism of Fig. 2 with a section of the body top cut away.

Fig. 3 is an elevation of the top section of the windshield frame carrying two rock shafts, each of which has its coacting crank arm, the cut off switch being shown in elevation with the casing in vertical section.

Fig. 4 is an elevation of the cut off switch, similar to Fig. 3 but showing the switch open.

Fig. 5 is a fragmentary side elevation, partly in section, of the switch shown in Fig. 4.

Fig. 6 is a fragmentary vertical section of the spring actuating knob of the cut off switch of Fig. 5 but in retracted position.

Fig. 7 is the wiring diagram of the electrically operated wiper.

Fig. 8 is an elevation of the rotary reciprocating wiper in position on the windshield of an automobile.

Fig. 9 is an enlarged detail view of one form of the wiper shown in Fig. 8.

Fig. 10 is a fragmentary vertical median section of the upper part of Fig. 9.

Fig. 11 is an enlarged section on the line 11—11 of Fig. 9.

Fig. 12 is a section on the line 12—12 of Fig. 9.

Fig. 13 is a fragmentary elevation of a modified form of rotary wiper.

Figs. 14 and 15 are fragmentary plan views of the left and right hand wipers of the modified form, the arrows indicating respectively the directions of rotation of such wipers.

Attached to the top of the car body 1 is a curved traction plate 2, upon which reciprocates the friction disc 3 which is connected to and rotates in unison wtih the armature of the motor 4. The traction plate is located above the back of the front seat, so as to preserve head room. Secured to the motor is the oscillating arm 5, curved so as to lie snugly on the underside of the car top. The arm 5 is pivoted at 7 to the bracket 6 carried by the wind shield frame and at its end has a pin 8 that engages a slot in the tie rod 9. The motor 4 is supplied with current from a suitable source by wires extending along the arm 5.

Each end of the tie rod 9, pivotally engages the crank arm 10 for oscillating the wiper blade shaft 11 to which is secured the wiper arm blade 12 that carries the wiper 13 for engaging the shield glass 14. Due to the position of the traction plate 2 and the length of the arm 5 and by the use of a high speed motor, a proper reduction in wiper blade speed is achieved without the use of gearing. This results in a very powerful wiper, due to the leverage involved, as a result of the relative distance between centers of the actuating pin 8 and pivot 7 and friction disc 3 and permtis the use of a blade as shown in Fig. 8.

From the above description, it will be seen that I have provided an electrical wiper of great power without gearing of any kind and one that imparts motion to the blades, as a result of motion of the motor housing rather than through a direct mechanical connection to the armature and reciprocates the blades by reason of the reversal of direction of rotation of the armature.

In order to reciprocate the motor 4 on the traction plate 3, the direction of rotation of the rotor of the motor must be reversed at the ends of travel. For this purpose, I mount on one of the crank arms 15 of the wiper, Fig. 3, a mercury reversing switch that has two sealed glass tubes 16 and 17, that contain curved metal contact plates 18, 19, 20, 21, 22 and 23, Fig. 7.

Referring to the wiring diagram, Fig. 7, there is shown a battery 24 as a source of power, a variable resistance switch 25 to control the armature speed and hence the wiper blade speed, the upper field coil 27 of a series wound direct current motor 26, including the conventional stator and rotor armature and brushes, two contact mercury switches 16, 17 to be oscillated in an arc, as result of movement of the wiper blades. As these switches are oscillated, the direction of the flow of current in one instance will be through the positive wire to the contacts 19, 23, thence to brush 28, then through the armature to brush 29 thence through contacts 20, 18 and the lower field coil 30 of the motor to the motor ground, causing the armature to revolve in one direction and resulting in the switches being carried in their oscillating movement through an arc sufficient to cause the mercury to flow to the other end of the switches, resulting in a circuit being formed through contacts 19, 22, thence to brush 29 and through the armature to brush 28, thence through contacts 21, 18 and from there to the motor ground. In this manner, the direction of flow of current is reversed through the armature while remaining unidirectional through the field, resulting in a reversal of direction of rotation of the armature.

In operation, when the variable resistance switch is closed, a circuit is formed through one of the various pairs of contacts as described and results in a rotation of the armature, which through the medium of the friction disc bearing on the traction plate, carries the motor toward one end of the track, or the other, imparting motion to the wiper blades through the elements described.

The arc of the mercury switch is such that as the wiper motor approaches the end of the friction plate, the current through the armature is reversed with a consequent reversal in direction of the friction disc, which causes the motor to travel toward the other end of the traction plate, where a reversal of the current flow to the armature again occurs, resulting in the electric wiper motor traveling again in the opposite direction along the path of the traction plate.

For automatically stopping the motion of the wiper blades and causing them to stop at the end of the stroke, I may mount an automatic switch 31 on the windshield frame 32 by means of a base plate 33 carrying a stationary but adjustable contact 34. A movable contact 35 is adapted to coact with the fixed contact 34 to complete the circuit for energizing the wiper motor. The movable contact 35 is affixed to a double headed arm 36 having as a point of rotation a trunnion shaft 37 which is integral with the base plate 33. Surrounding the shaft 37 is a torsion spring 38, one end being fixed to the base plate 33 and the other end to the arm 36.

With the windshield wiper in motion, the rock shaft crank arm 39, oscillates under motion imparted by the oscillating tie rod 40. The upper end of the arm 36 is provided with a swivelled head 41, freely rotatable in one direction but whose movement is prevented in the opposite direction by means of a stop 42 on the head engaging an abutment 43 on the arm 36. Surrounding the arm 36 is a torsion spring 44, one end being fixed to the head 41 and the other to the arm 36. The head 41 is bored to form a bearing for the abutment pin 45 to which is affixed a pin actuating knob 46. Within this head there is located a spring pressed ball latch 47 adapted to contact with depressions 48 in the abutment pin, so that the pin can be held in either an inward or outward position. In order to energize the wiper motor, the pin 45 is pulled out from contact with the rock shaft arm 39. This permits the stored energy in the torque spring 38 to rotate the arm 36 in a clockwise direction, closing the electrical contacts 34, 35 and energizing the wiper motor, which causes the crank arm 39 to oscillate, thus oscillating the wiper arms. In order to cause the switch to function to automatically open the circuit, the pin 45 is moved out to its extended position to contact the crank arm 39 on the return or counterclockwise stroke. This force is sufficient to overcome the resistance of the torque spring 38 and the resulting movement separates the two electrical contacts 34 and 35, thereby breaking the circuit. The movement of the wiper motor will have a certain amount of inertia, so that in designing the switch, the adjustable contact 34 is so positioned that when the inertia is spent, the wiper blade has reached the desired position wherein it will offer while at rest, a minimum of obstruction to vision.

In order that it may not be necessary to time the moment at which the pin 45 is extended so that the switch will be opened by the next movement of the rock shaft crank arm 39, the head 41 is swiveled. By swiveling the head 41, it is possible to cause the switch to function to stop the wiper by opening the circuit at any time regardless of the position of the rock shaft crank arm 39, for it will be observed that should the pin be depressed in the path of travel of the crank arm when position of the same is to the left of the switch arm in Fig. 4, as the arm oscillates in the opposite direction and contacts the abutment pin, the pressure of the arm will simply cause the head to swivel, allowing the crank arm to pass uninterrupted. After this occurs, the spring 44 swivels the head in the opposite direction until the stops 42 and 43 are in contact, so that when the arm travels back, the switch will be opened by pressure and movement of the crank arm 39 against the abutment pin 45. To start the wiper, it is only necessary to move the pin 45, Fig. 5, to the right which releases the energy of the spring 38, causing the arm 36 carrying the pin to revolve clockwise, Fig. 4. This closes the contacts 34, 35 and results in the wiper action being resumed. To cause the wiper action to cease, it is only necessary to move the knob to the left, Fig. 5. On the next stroke of the rocker arm 39 to the left, the circuit breaking movement takes place.

Referring to Figs. 8–12, there is disclosed a form of wiper that both oscillates and rotates. Such a wiper requires considerably more power than can be obtained with the conventional vacuum wiper or with the present electrically operated wipers. By using the arrangement of Figs. 1 and 2, a sufficient amount of power is available, not present in other conventional designs.

Secured to the wind shield frame 49 is a bearing 50 in which oscillates the shaft 51, provided with an operating arm 52, connected to the source of operating power, such as the tie rod 53. Also affixed to the wind shield frame 49 is the curved rack 54. Keyed to the shaft 51 is a downwardly disposed oscillating shaft 55, on which is loosely mounted a pinion 56, so positioned with reference to the rack 54, that the oscillating movement of the shaft 55 will impart to the pinion 56 a reversible rotating motion as a result of the oscillating movement of the shaft 55. Secured to the shaft 55 is one form of rubber wiper blade 57 that is mounted on a bearing sleeve 58 keyed to the pinion 56 as by pins 59 and which rotates on the shaft 55. Rotary motion of the pinion 56 results in a rotary motion being imparted to the wiper blade which is loosely mounted so as to be turnable upon the oscillating shaft 55. For maintaining the rack 54 in mesh with the pinion 56 and to supply pressure to maintain the wiper blade in contact with the glass surface of the windshield 60, I provide a resilient mounting for the rack 54. The pins 61 are secured into the windshield frame and the rack is slidably mounted on the pins, springs 63 between the rack and adjusting nuts 64 providing the necessary resilient pressure to hold the rack against the pinion and the wiper against the wind shield. A wiper blade of this type is very effective in its action particularly when encountering soft snow or slush. The arrangement also provides a blade of such a type and operating in such a manner as to give a greater life to the usefulness of the unit.

Referring to the modified form of wiper shown in Fig. 13, there is provided an overrunning clutch 65, one part 66 being secured to the pinion 56 and the other part 67 being keyed to the shaft 55. The purpose of the overrunning clutch is to rotate the wiper blade when oscillated in one direction but not to rotate it when oscillated in the opposite direction. The arrows in Figs. 14 and 15 indicate the direction of rotation of the pinion, effective through the medium of the overrunning clutch to transmit this motion to the wiper blade. When revolving in a direction opposite to that indicated by the arrows, the overrunning clutch transmits no rotary motion from the pinion to the wiper. In operation, as the wiper blade is oscillated to the left, in Fig. 13, the overrunning clutch will cause the wiper of Fig. 14 to rotate while that of Fig. 15 will follow without rotation of the wiper and vice versa. Thus the oscillating strokes are in unison while the rotary motion of the wiper unit takes place alternately. When using two wiper blades of the type shown in Figs. 9 and 10, if the rotary wiper action is effective, one blade will scuff or throw water or soft snow and the like on the area just cleaned by the other blade, but this is avoided when the wiper blade rotates as in the modified form.

I claim:

1. In combination, a pivoted wiper arm, an actuating arm mounted to pivot about an axis disposed angularly with relation to the pivotal axis of said wiper arm, a driving connection between one end of said actuating arm and said wiper arm, a track, a reversible motor carried by the opposite end of said actuating arm and a roller driven by said motor and having driving engagement with said track.

2. A windshield wiper for automotive vehicles comprising an electric motor as a prime mover, a track supported by the top of the vehicle body, an oscillating wiper arm mounted adjacent the windshield to swing about a fixed axis, means for reciprocating the motor on the track, an arm connected to and oscillating with the motor frame about a second fixed axis and connected to the oscillating arm for transmitting the reciprocating motion of the motor to the wiper arm.

3. In combination, a wiper arm, an actuating arm, means pivotally mounting the adjacent ends of the two arms to swing in different planes, a track, a reversible motor carried by the opposite end of the actuating arm and a roller driven by said motor and having driving engagement with said track.

4. The combination of claim 1 in which the motor of the motor driven roller is a series wound direct current motor, the armature of which is provided with a friction disc that travels on the track, the direction of rotation of the armature being reversed to thereby reciprocate the motor on the track.

5. The combination of claim 1 in which the motor of the motor driven roller is a series wound direct current motor, the armature of which is provided with a friction disc that travels on the track, the direction of rotation of the armature being reversed to thereby reciprocate the motor on the track, and in which the direction of rotation is controlled by reversing the direction of the current in the motor through the medium of a switch carried by the wiper arm.

6. An electrically operated windshield wiper for automotive vehicles comprising an oscillating wiper supported by the windshield frame, a motor for driving said wiper, a movable arm adjacent thereto and provided with a switch contact for cooperating with a stationary contact adjacent thereto for completing the circuit to energize the wiper motor, and settable means for transmitting the motion of the wiper in one direction to the said arm to break the contact and stop the motion of the wiper blades at the end of the stroke, the said arm being spring-actuated to close the said contacts, and a yieldable mounting for the settable means whereby the wiper may freely move in the opposite direction.

7. An electrically operated wind shield wiper for automotive vehicles comprising an oscillating wiper supported by the wind shield frame, a pair of switch contacts, a pivotally mounted arm carrying one of said contacts, a spring connected to said arm for urging the arm to close the contacts, and a pin carried by the end of the arm and manually settable into a position in the path of the wiper whereby said wiper is rendered effective to actuate the arm and open said contacts.

8. An electrically operated wind shield wiper for automotive vehicles comprising an oscillating wiper supported by the wind shield frame, a pair of switch contacts, a pivotally mounted arm carrying one of said contacts, a spring connected to said arm for urging the arm to close the contacts, a swiveled head on the end of the arm, and a pin carried by the head and manually settable into a position in the path of the wiper whereby said wiper is rendered effective to actuate the arm and open said contacts.

9. An electrically operated wind shield wiper for automotive vehicles comprising an oscillating wiper supported by the wind shield frame, a pair of switch contacts, a pivotally mounted arm carrying one of said contacts, a spring connected to said arm for urging the arm to close the contacts, a head swiveled on the end of the arm and free to swivel in one direction, means limiting the swivel movement of the head in the opposite direction, and a pin carried by the head and manually settable into a position in the path of the wiper whereby said wiper is rendered effective to actuate the arm and open said contacts.

10. A windshield wiper comprising a rack element secured to the windshield frame, an oscillating shaft carrying the wiper blade, a rotating pinion element carried by the shaft and engaging the rack element to rotate the blade when the shaft is oscillated, and means applying spring pressure to one of said elements to maintain the rack and pinion elements in meshing relation.

11. A windshield wiper comprising a rack secured to the windshield frame, an oscillating shaft carrying the wiper blade, a rotatable pinion carried by the shaft and engaging the rack and means to impart rotary movement from the pinion to the blade in one direction only when the shaft is oscillated.

12. A windshield wiper comprising using two wiper blades arranged to wipe the same side of the windshield, means for oscillating the blades in unison, and means for alternately rotating the blades as they are oscillated.

13. A windshield wiper comprising two wiper blades arranged to wipe the same side of the windshield, means for oscillating the blades in unison, and means for alternately rotating the blades in opposed directions during oscillation.

14. A wind shield wiper as claimed in claim 11 in which the said means is an over-running clutch, one part being secured to the pinion and the other part keyed to the shaft.

DOUGLAS COLLINS.